US006203036B1

(12) United States Patent
LaVaute et al.

(10) Patent No.: US 6,203,036 B1
(45) Date of Patent: *Mar. 20, 2001

(54) BUSING CART

(75) Inventors: Peter A. LaVaute, Columbia; Sydney W. Baumgartner, Hallsville, both of MO (US)

(73) Assignee: Sneezeguard Solutions, Inc., Columbia, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,425

(22) Filed: May 18, 1998

(51) Int. Cl.[7] .................................................. B26B 1/04
(52) U.S. Cl. .......................................... 280/79.3; 280/79.2
(58) Field of Search ................................. 280/79.3, 79.2, 280/47.35, 47.26; 296/22; 211/126.2; 4/652; 210/241

(56) References Cited

U.S. PATENT DOCUMENTS

| 664,945 | * | 1/1901 | Guion ........................................ 4/652 |
| 772,719 | * | 10/1904 | Koslofsky ................................. 4/652 |
| 2,022,591 | | 11/1935 | Everitt .................................. 312/167 |
| 2,784,999 | * | 3/1957 | Hunt ........................................ 296/22 |
| 3,330,576 | | 7/1967 | Willis .................................. 280/79.3 |
| 3,512,826 | * | 5/1970 | Hahn ......................................... 296/22 |
| 4,052,081 | | 10/1977 | Becker, III ........................... 280/79.3 |
| 4,527,707 | | 7/1985 | Heymann et al. .................... 220/1 R |
| 4,621,739 | | 11/1986 | Heymann et al. ....................... 211/74 |
| 4,892,224 | * | 1/1990 | Graham ................................ 220/404 |
| 5,458,350 | * | 10/1995 | Johnson et al. .................. 280/47.26 |
| 5,853,581 | * | 12/1998 | Rayborn et al. ..................... 210/241 |

OTHER PUBLICATIONS

Busing Cart invented by Peter A. LaVaute and Sydney W. Baumgartner—displayed at a tradeshow and offered for sale on Oct. 7, 1996.

* cited by examiner

Primary Examiner—Michael Mar
Assistant Examiner—Hau Phan
(74) Attorney, Agent, or Firm—Gregory W. Osterloth; Dahl & Osterloth LLP

(57) ABSTRACT

A busing cart having a wheeled frame for carrying a reservoir and a trash receptacle. A strainer is positioned over an opening in the reservoir, and optionally, a chute is positioned over an opening in the trash receptacle. The strainer and chute have adjacent walls which form an acute angle with respect to horizontal so as to 1) provide the chute with a larger opening for receiving dishes to be cleared, and 2) provide the strainer with a larger straining surface. The busing cart also has a variety of platforms for supporting dishwasher racks (for flatware, glasses, etc.) and stacked plates.

17 Claims, 9 Drawing Sheets

BUSING CART

FIELD OF THE INVENTION

The invention pertains to busing carts, and more specifically, to busing carts which allow glasses, dishes and other eating utensils (e.g., forks, knives and spoons) to be bused between a kitchen and an eating area.

BACKGROUND OF THE INVENTION

A variety of tubs, dishpans, glass racks and dollies are typically used for transporting glasses, dishes and other eating utensils between a kitchen and an eating area.

These means are ineffective in that they all require numerous trips to be made between a kitchen and eating area during the eating area's clearing and/or setup (these activities being collectively referred to herein as "busing"). This is particularly true when the eating area is a large banquet facility. For example, tubs and dishpans provide no means of separating the variety of dishes that need to be transported. A limitation on tubs, dishpans and glass racks is that one may only transport what one can carry. Dollies are limited as to the number of glass racks which may be safely transported in a single stack (due to tipping concerns), and dish racks loaded with plate and/or flatware containers are not amenable to stacking.

The above recited busing means are also ineffective in that they require excessive handling of dishes. For example, when an eating area is being cleared, dishes and glasses are often placed in the same tub for transport back to the kitchen. It is inevitable that the glasses will bump against one another, and against the dishes—leading to a high risk of breakage (especially for the glasses). Once the tub is brought to the kitchen, the items in the tub must be transferred to dishwasher racks. This extra handling step further increases the risk of breakage. Even when glasses are cleared from a table via a glass rack, there is a high risk of breakage. This is due to the fact that glasses must be placed in a glass rack "open end up" for transport to the kitchen without spillage. Once the glasses are returned to the kitchen, they are emptied, and then returned to the glass rack "open end down". In this manner, they do not collect wastewater when processed through a dishwasher. Once again, the extra handling leads to a high risk of breakage.

Conventional busing means are also ill-suited for setup purposes. For example, water glasses are often brought to an eating area unfilled, or are brought filled in small quantities (carried on a serving round or the like). Serving rounds are obviously limited in the quantity of glasses they can transport. However, when glasses are brought to an eating area unfilled, it is a time consuming task to fill the glasses utilizing pitchers or the like. If filled glasses could be transported to an eating area more efficiently, it would be much easier to fill the glasses in the kitchen.

A need therefore exists for a busing cart which can 1) transport a large number and variety of glasses, dishes and/or other eating utensils, 2) reduce the number of times dishes (especially glasses) are handled, and 3) function as a universal busing means (i.e., function equally as well in clearing and setup operations). A busing cart which is both safe to use and easy to clean is also desirable.

SUMMARY OF THE INVENTION

To attempt to fill the foregoing need, and/or other needs, the inventors have devised a new busing cart and method of using same.

The new busing cart comprises a reservoir and trash receptacle carried by a wheeled frame. A strainer is positioned over an opening in the reservoir so that glasses containing matter other than liquid and/or ice may be emptied into the strainer. Solid waste is captured by the strainer, while liquids flow into the reservoir. When the strainer is full, or after ice therein has melted, the strainer may be detached from the reservoir and emptied into the trash receptacle.

The trash receptacle preferably comprises a detachable chute. The chute and strainer are adapted to have adjacent walls. Their adjacent walls form an acute angle with respect to horizontal so as to 1) provide the chute with a larger opening for receiving dishes to be cleared, and 2) provide the strainer with a larger straining surface.

It is also preferred that a sink, large enough to support a glass rack, be mounted on the wheeled frame. The sink's drain may be connected to the reservoir via a drain pipe. When a glass rack is placed on the sink, glasses containing only liquid and/or ice may be placed directly therein in an "open end down" position. Other glasses may be emptied into the strainer, and then also placed in the glass rack "open end down". In this manner, the glasses need only be handled once prior to washing.

The busing cart disclosed herein may also comprise a number of platforms for supporting dishes, glasses, and other eating utensils. For example, a first platform may be provided for supporting glass racks. Glass racks may be stacked on this platform, or alternatively, may be stacked on the sink. A second platform may be provided for supporting stacked plates. If this platform is divided (e.g., by a dividing wall), plates may be stacked on two or more sides of the platform. The dividing wall may be fitted on each side with slidable vertical dividers so as to better support plates of varying diameter. For example, a stack of 12" plates and a stack of 5" plates could be supported on one side of the dividing wall. At the same time, a stack of 9" plates and a stack of 6" plates could be supported on the other side of the dividing wall. A third platform may be provided for supporting a flatware rack.

The busing cart may also be fitted with removable drip pans. In this manner, fluids dripping from the stacked plates and/or glass racks may be caught.

Such a busing cart has many advantages. First, all of the dishes, glasses, eating utensils and trash may be bused from an eating area in a single operation. Second, glasses bused from an eating area may be placed in glass racks "open end down" so that repetitive handling of glasses is avoided. Third, dishes, glasses and eating utensils may be bused to an eating area in a single operation. Since the busing cart supports a plurality of glass racks, and has various means for catching spills, numerous filled glasses may be transported to an eating area. Fourth, the wheeled nature of the cart eliminates the need to carry heavy dishes, glasses and the like.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which:

FIG. 11 illustrates a shroud attached to one side of the busing cart.

DESCRIPTION OF THE PREFERRED EMBODIMENT

Figure 1:
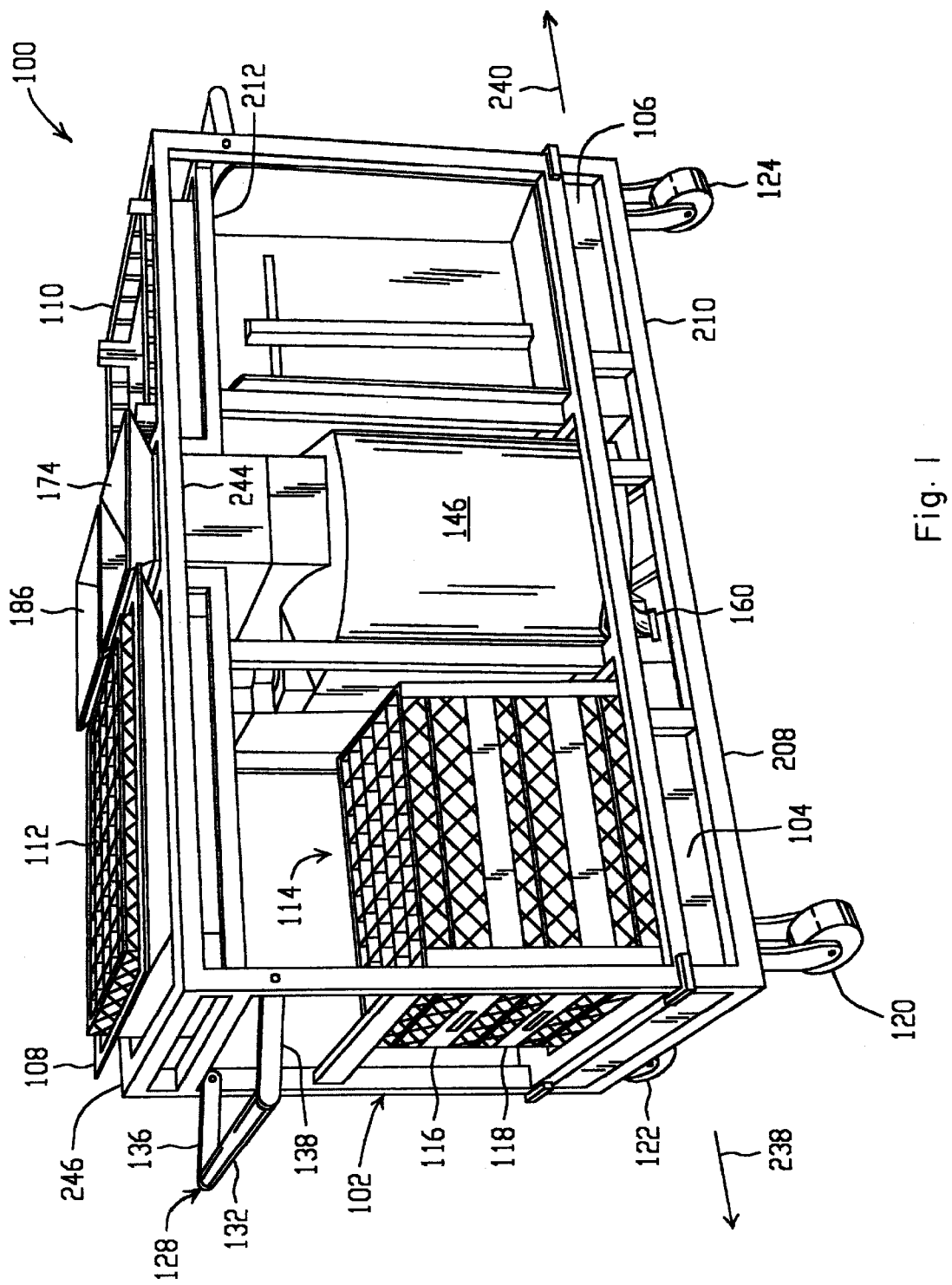
FIG. 1 is a front perspective view of a busing cart.
Figure 2:
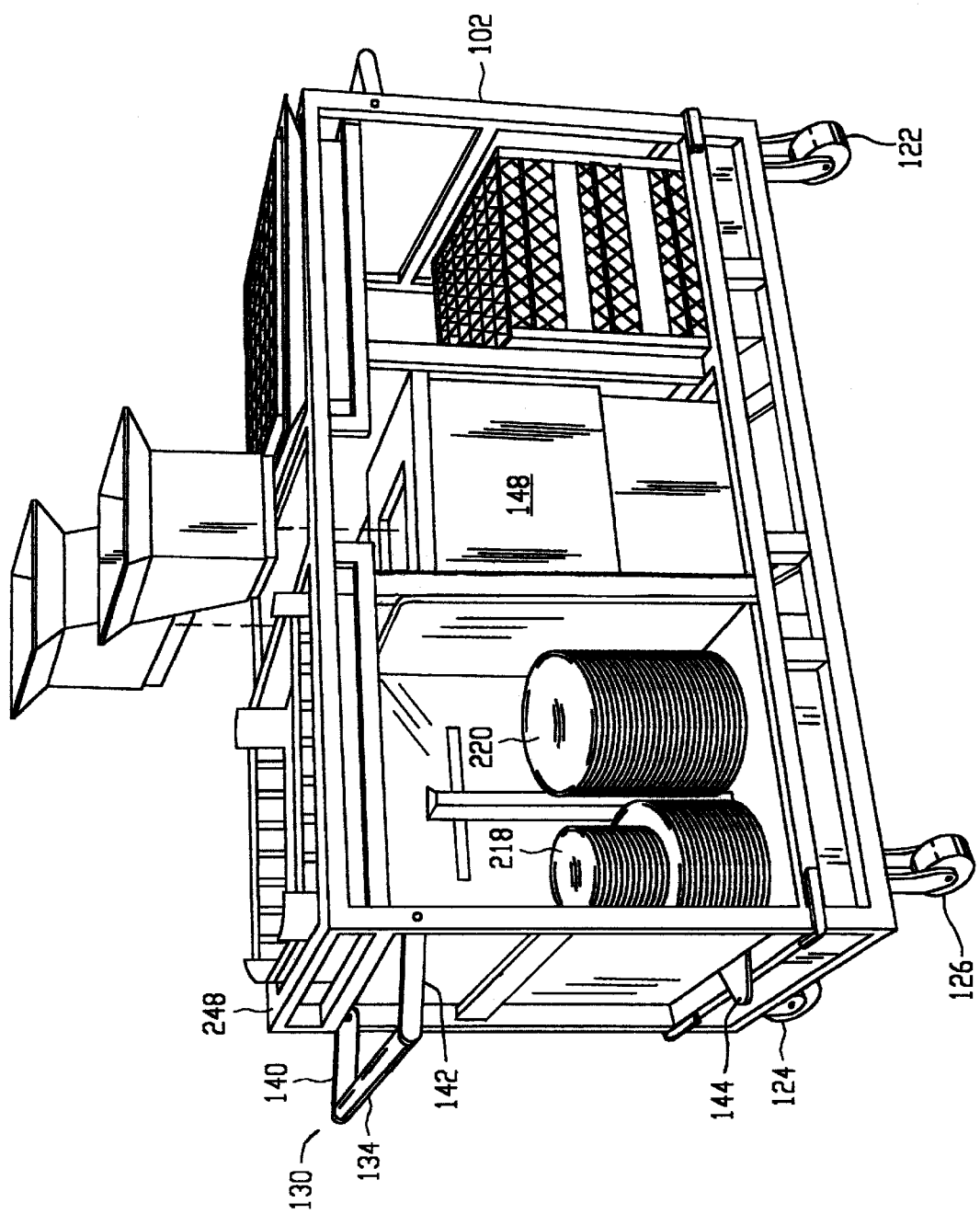
FIG. 2 is a first rear perspective view of the FIG. 1 busing cart.

FIGS. 1–11 illustrate a preferred embodiment of a busing cart 100. The cart 100 (FIG. 1) comprises a frame 102 constructed of hollow, aluminum support members. The individual support members may be welded together to form the frame 102. In a preferred embodiment, each member has a 1.25"×1.25" square cross section, and a 0.14" material thickness. Aluminum support members were chosen because they are strong, light-weight and rust-resistant. However, the support members could be formed of other rust-resistant materials (e.g., stainless steel or painted steel). The cross section and fill of the support members is a matter of choice (though members of square cross section may be better suited to firmly support the drip pans 104, 106, sink 108, and racks 110, 112, 114, 116, 118 discussed later in this description.

Caster plates (not shown) may be welded to each corner of the frame's base so that caster wheels 120–126 (FIGS. 1, 2) may be fitted thereto (preferably bolted thereto). Suitable caster wheels are Colson's 5" diameter, 350 lb. capacity, perform a rubber caster wheels. It is preferable that two of the caster wheels 124, 126 be of the swivel type (e.g., Colson part no. 4-5109-459-2), and that the other two caster wheels 120, 122 be of the locking or "swivel with brake" type (e.g., Colson part no. 44-5109-459-2).

Each end of the busing cart 100 may be fitted with a handle 128, 130. If provided, the handle(s) 128, 130 are preferably formed of aluminum, and are pivotably attached to an upper portion of the frame 102. Each handle 128, 130 may comprise a tubular crossbar 132, 134 extending between two pivotably mounted extension members 136/138, 140/142. The tubular crossbars 132, 134 are preferably round in cross section, and are covered in full or in part by a rubberized grip (not shown).

A hitch 144 may be attached to the base of the frame 102 at one or both ends of the busing cart 100 (preferably only at one end). The hitch 144 allows the busing cart 100 to be towed by a motorized unit (not shown).

Figure 4:
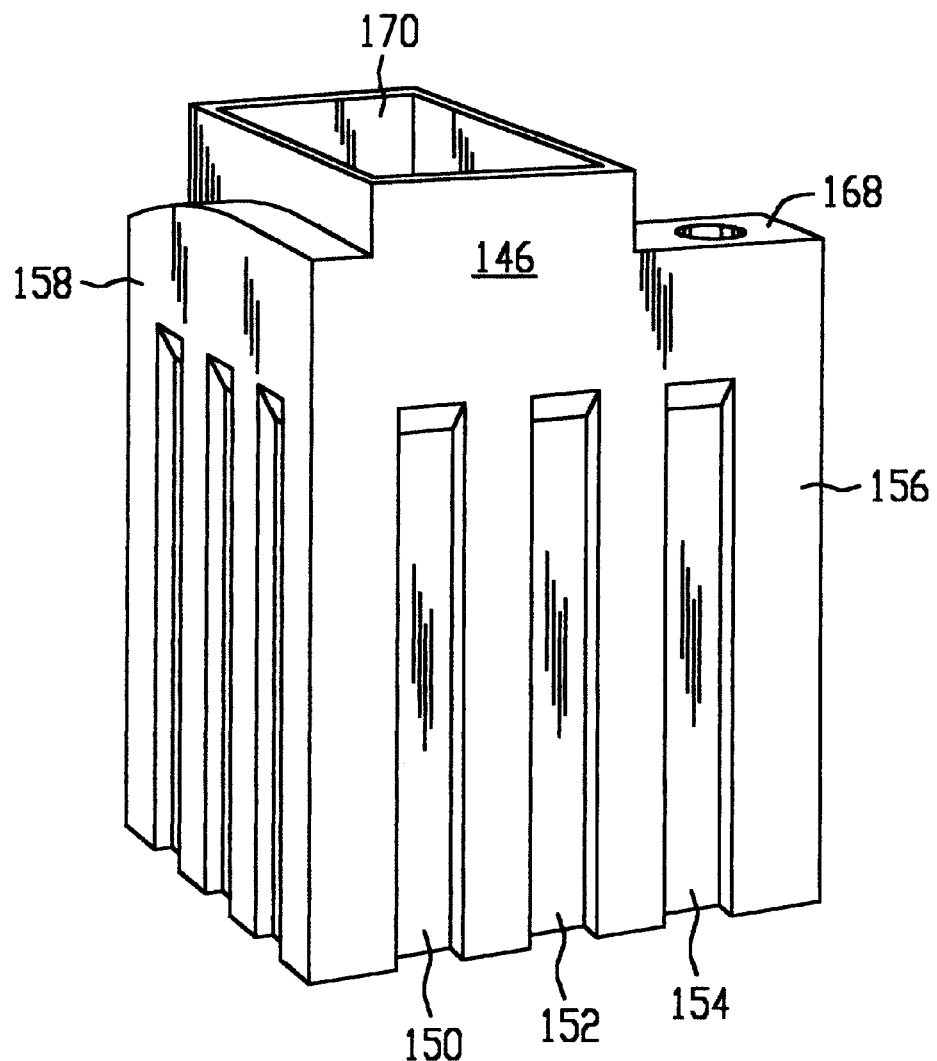
FIG. 4 is a rear perspective view of the reservoir of the FIG. 1 busing cart.
Figure 5:
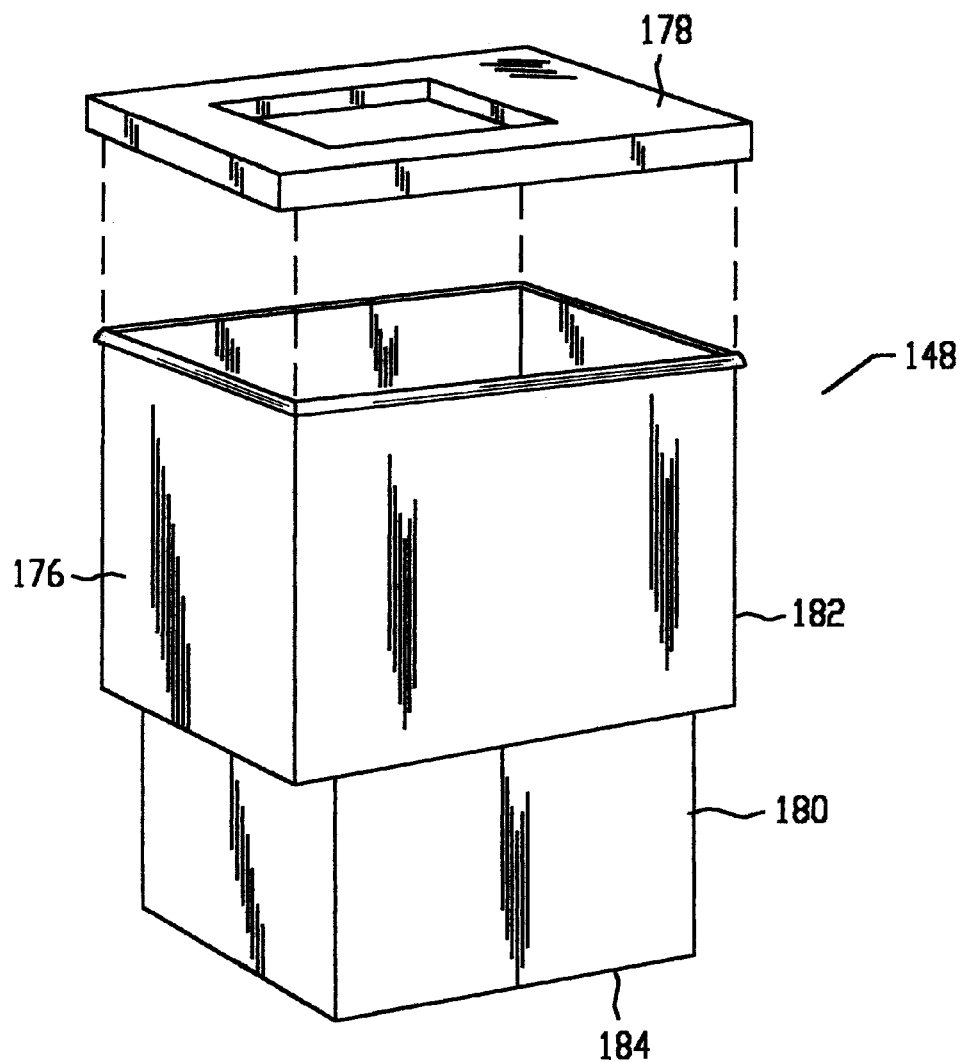
FIG. 5 is a rear perspective view of the trash bin of the FIG. 1 busing cart.

The central interior portion of the busing cart 100 comprises an area which is adapted to carry a reservoir 146 (FIGS. 3, 4) and a trash bin 148 (FIG. 5). Each is preferably formed of polyethylene. While the reservoir 146 may be fixedly mounted within the frame 102 of the busing cart 100, the trash bin 148 is preferably removable.

Figure 3:
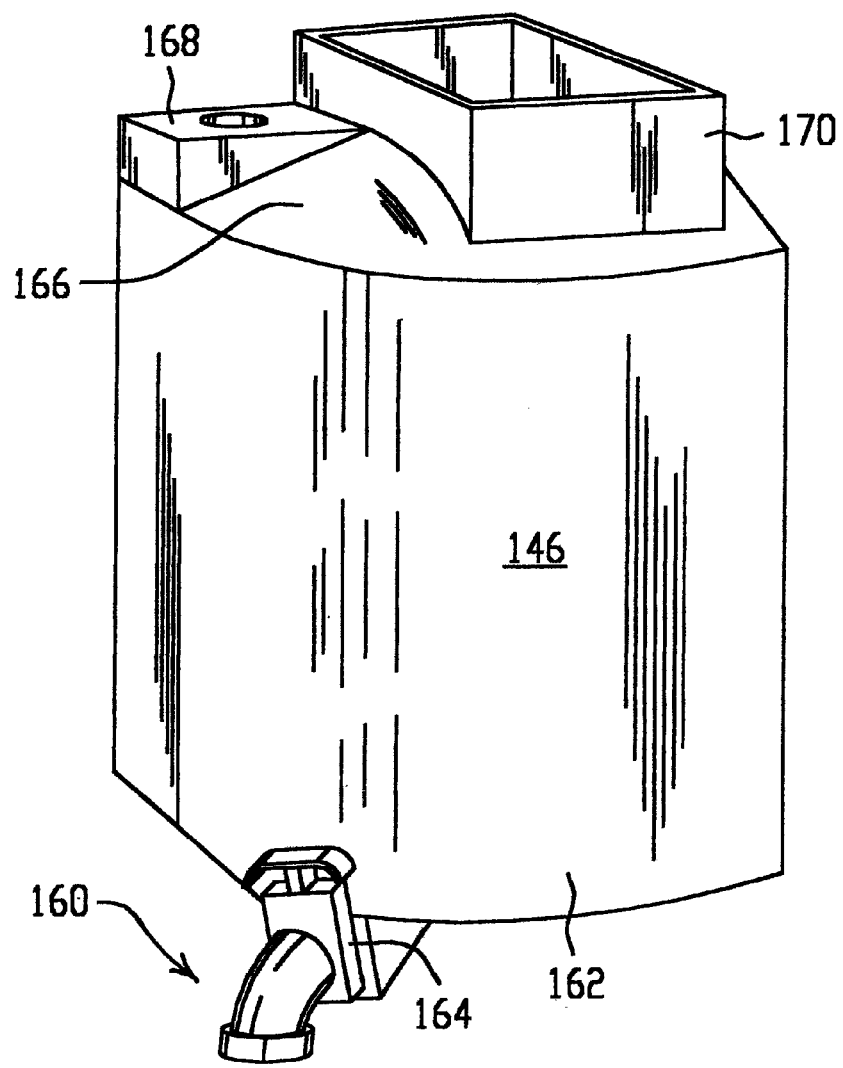
FIG. 3 is a front perspective view of the reservoir of the FIG. 1 busing cart.

The reservoir 146 is shown more clearly in FIGS. 3 and 4. The reservoir 146 has a quarter round shape, with stiffening ribs 150, 152, 154 formed in the flat walls 156, 158 thereof. A drain 160 is mounted in the rounded wall 162 of the reservoir 146. A valve 164 or similar flow control device in the drain 160 may be used to drain the contents of the reservoir 146 when the reservoir 146 is maneuvered over a floor drain. A valve 164 which is suitable for such a purpose is Bristol's 1.5" HUB×1.5" spigot termination valve (Bristol part no. 6611AB). The rounded wall 162 of the reservoir 146 provides a setback for the drain 160 so that it may be confined to the boundaries of the cart's frame 102. The top of the reservoir 166 is generally dome shaped, but comprises two protrusions 168, 170. The first protrusion 168 has a square top with a circular opening therein. A sink drain 172 may be fitted thereto. The second protrusion 170 has a rectangular top with an elongated opening therein. A strainer 174 (which has yet to be described) may be fitted thereto.

The trash bin 148 is shown apart from the busing cart 100 in FIG. 5. In a preferred embodiment, the trash bin 148 comprises a container 176 and a lid 178. The container 176 and lid 178 may be distinct pieces, or may be integrally formed. The container 176 is shown in FIG. 5 to have a generally rectangular cross section. If the container's cross section is rectangular, its lower walls 180, 182 should be inwardly offset as shown in FIG. 5, or alternatively, its walls should taper inwardly towards its bottom 184. This makes it easier to remove the trash bin 148 from (or insert it into) the cart's frame 102. The lid 178 fits over the container 176 and has an opening therein which receives a chute 186.

Figure 6:
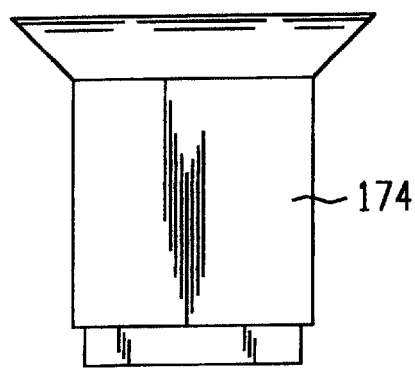
FIG. 6 is a front elevational view of the strainer of the FIG. 1 busing cart.
Figure 7:
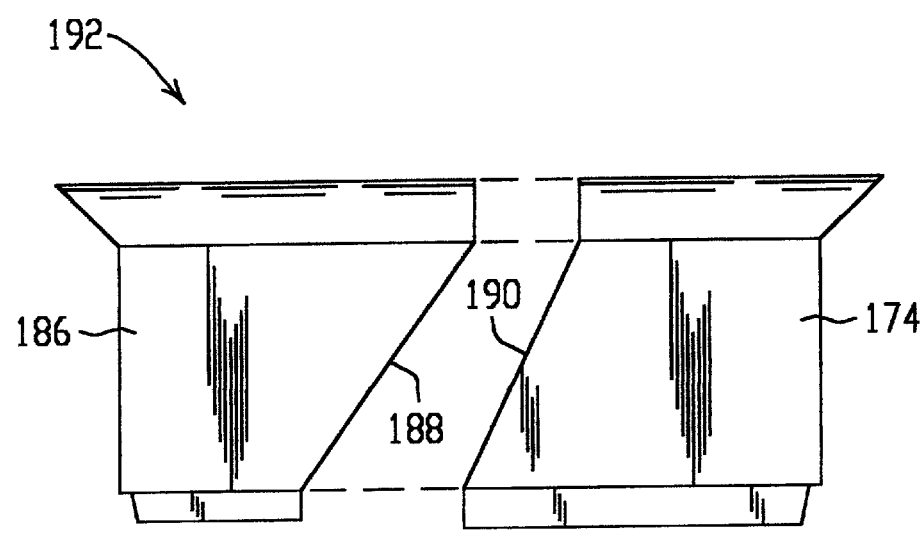
FIG. 7 is a side elevational view of the strainer and chute of the FIG. 1 busing cart.
Figure 8:
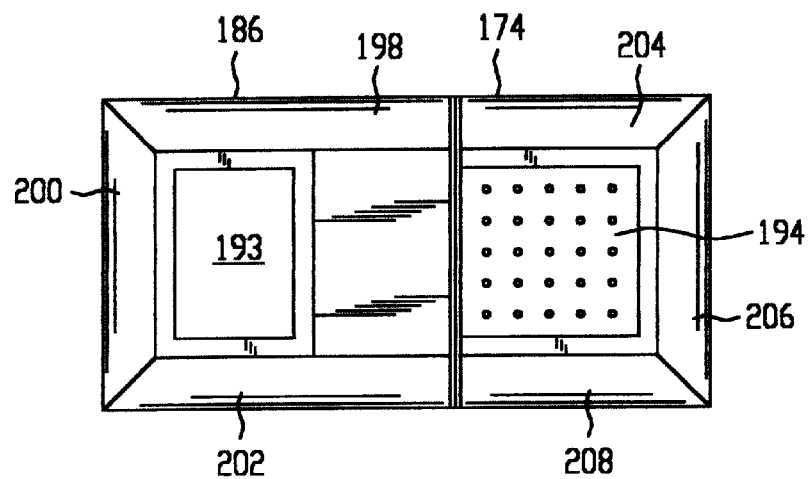
FIG. 8 is a top plan view of the strainer and chute of the FIG. 1 busing cart.
Figure 9:
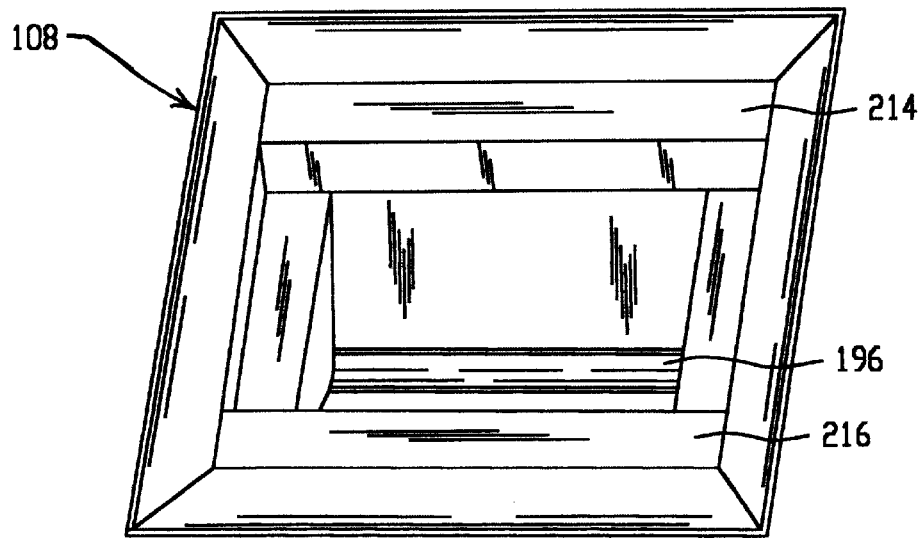
FIG. 9 is a front perspective view of the sink of the FIG. 1 busing cart.
Figure 10:
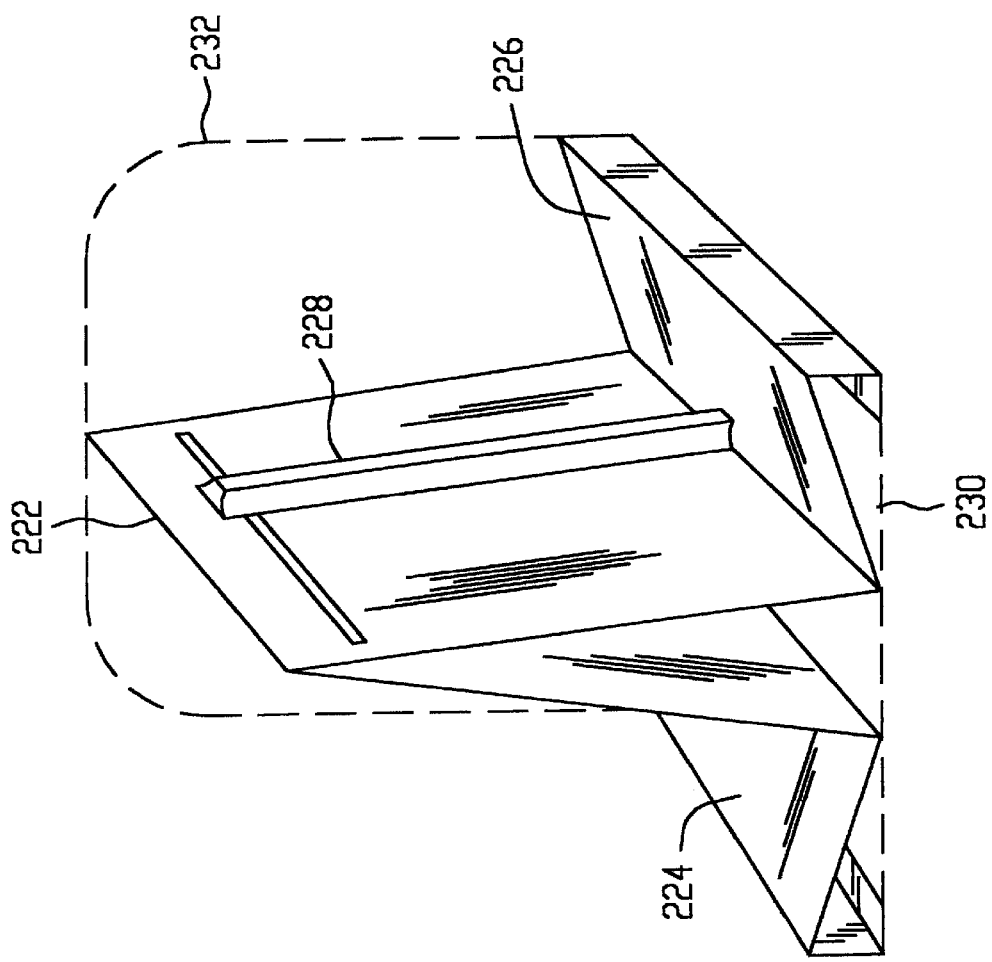
FIG. 10 is a front perspective view of the platform and dividing wall for holding plates of the FIG. 1 busing cart.

FIGS. 6–8 illustrate a strainer 174 and chute 186 which respectively mate to (or are positioned over) openings in the reservoir 146 and trash bin 148. The strainer 174 comprises a plurality of first openings on its bottom surface 194, which together from the straining surface 194 of the strainer 174. The strainer 174 also comprises a second opening, which second opening receives liquid and debris which is poured into the strainer 174. The chute 186 comprises upper and lower 1943 openings. Thus, when trash is inserted into the chute's upper opening, it passes through the chute's lower opening 193 and is collected in the trash bin 148. As illustrated in FIG. 7, the strainer 174 and chute 186 have adjacent walls 188, 190 which form an acute angle with respect to horizontal. In this manner, the upper opening of the chute 186 extends over the bottom surface 194 of the strainer 174, thereby helping to 1) provide the chute 186 with a larger opening 192 for receiving dishes to be cleared, and 2) provide the strainer 174 with a larger straining surface 194 (FIG. 8). The strainer 174, chute 186, reservoir 146, and trash bin 148 may all be formed of rotation molded polyethylene.

The upper opening 192 of the chute 186 is preferably large enough to receive a plate of any size. In this manner, one may insert a plate substantially into the chute 186 so that food cleared therefrom is more likely to make it into the trash bin 148. The lower opening 193 of the chute 186 is preferably smaller than a smallest conceivable plate. In this manner, a plate inserted into the top 192 of the chute 186 is prevented from falling into the trash bin 148 should it accidentally be dropped.

The claims may at times refer to a trash receptacle. A trash receptacle, as that term is used in the claims, comprises the above-mentioned container 176, either alone or in combination with a lid 178 and/or chute 186.

When the contents of a glass are emptied into the strainer 174, solid waste such as lemons and ice will be caught within the strainer 174. When the strainer 174 is full (or in some cases, when the ice therein has melted), the contents of the strainer 174 may be emptied into the chute 186. Note that the busing cart 100 of FIGS. 1–11 requires removal of the chute 186 prior to removal of the strainer 174. If this is the case, the strainer 174 may be emptied directly into the trash bin 148.

Each wall of the chute 186 and the strainer 174, but for their adjacent walls 188, 190, may comprise a flared lip 198, 200, 202, 204, 206.

The top of the busing cart 100 may be fitted with one or more sinks 108. In its preferred embodiment, the busing cart 100 comprises one sink 108. However, it is envisioned that the cart 100 could comprise more sinks, such as two sinks on opposite sides of the reservoir 146. The sinks 108 may be formed from vacuum molded ABS plastic. Each sink 108 preferably comprises an integrally formed channel 196 which terminates in a drain.

After a sink 108 is fitted to the frame 102 of the busing cart 100, its drain is connected to an opening in the reservoir 146 via a drain pipe 172. The drain pipe 172 may be rigid or flexible. ABS pipe having an approximate 1.5" diameter is preferred.

The busing cart 100 of FIGS. 1–11 is specifically designed for busing dishes, glasses and other eating utensils. The busing cart 100 therefore comprises a number of platforms 208, 210, 212 (FIG. 1) for holding same. A first platform 208 is positioned below the sink 108, and is designed to hold stacks of conventional dishwasher glass racks 114–118. The sink 108 may comprise ledges 214, 216 and/or a lip which serve as an additional platform for supporting one or more glass racks 112.

A second platform 210 is positioned adjacent the strainer 174 and chute 186, opposite the sink 108. This platform 210 is preferably designed to support a rack 110 for gathering flatware.

A third platform 212 is positioned below the second platform 210, and is designed to support stacks of plates 218, 220. This third platform 212 is preferably fitted with the dividing wall 222 and support base 224/226 illustrated in FIG. 10. The dividing wall 222 and support base 224/226 may be formed from a single piece of vacuum molded ABS plastic, and together, provide for stacking plates 218, 220 on each side of the dividing wall 222. Furthermore, the dividing wall 222 may be fitted on each side with horizontally slidable vertical dividers 228 so as to better support plates 218, 220 of varying diameter. For example, a stack of 12" plates and a stack of 5" plates could be supported on one side of the dividing wall 222. At the same time, a stack of 9" plates and a stack of 6" plates could be supported on the other side of the dividing wall 222. The dividing wall 222 and support base 224/226 may be formed from an initially flat member which is bent (or molded) to form said dividing wall 222 and support base 224/226. Alternatively, one or both ends of the dividing wall 222 and support base 224/226 may be closed as suggested by dashed line 230. Furthermore, one or both ends of the dividing wall 222 and support base 224/226 could be closed with a panel as suggested by dashed line 232.

The lower portion of the busing cart's frame 102 supports two drip pans 234, 236. These drip pans 234, 236 may be formed of rotation molded polyethylene, or other material which is easily maintained in a wet environment. The drip pans 234, 236 may be removed from the busing cart 100 by sliding them out and away 238, 240 from the center of the cart 100. In a preferred embodiment, the drip pans 234, 236, together with the cart's frame 102, form the afore-mentioned first and second platforms.

A convenient feature of the busing cart 100 is that a person using it to bus tables is provided access to the sink 108, strainer 174, trash bin 148 (typically via chute 186) and platform 210 for supporting a flatware rack via a substantially planar top portion of the busing cart 100.

Figure 11:
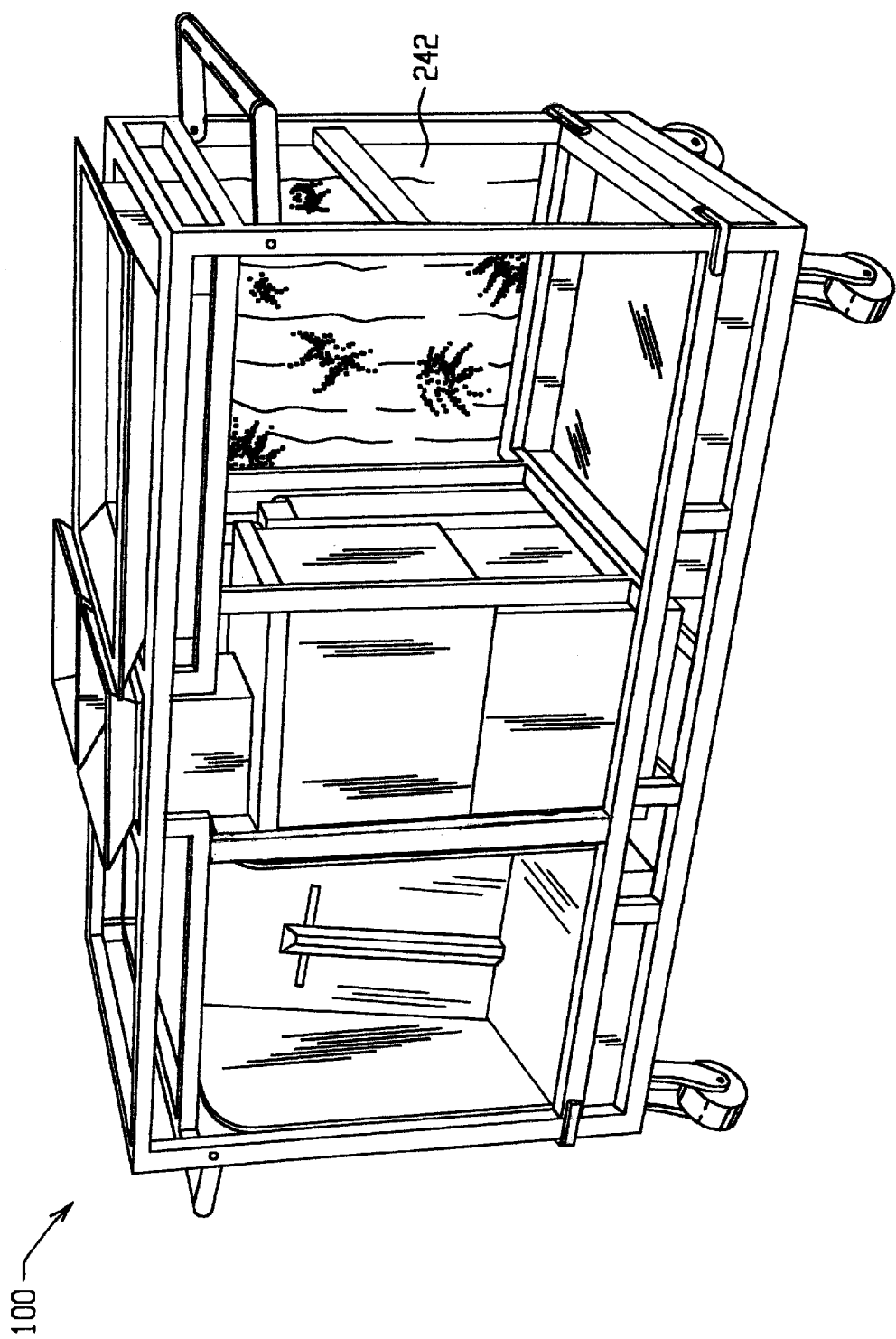
FIG. 11 is a second rear perspective view of the FIG. 1 busing cart.

FIG. 11 illustrates another preferred feature of the busing cart 100. In FIG. 11, a shroud 242 is hung from support member 244 (FIG. 1). This support member 244, as well as other support members (such as support members 246 and 248), may comprise a channel cut from their otherwise square cross sections. Alternatively, one or more Velcro® strips could be attached to these support members 244, 246, 248. In this manner, items such as a shroud 242 may be hung from these support members 244, 246, 248. The shroud 242 illustrated in FIG. 11 is a cloth shroud (i.e., skirting). However, a more rigid shroud member could also be hung from appropriate support members 244, 246, 248.

The preferred dimensions of the afore-described busing cart 100 are 5.0'W×2.0'D×3.0'H. Given these dimensions, the cart's width may be divided so that 18" is provided for plate stackage, 16" is provided for the reservoir 146 and trash bin 148, and 21" is provided for glass racks 114–118.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A busing cart, comprising:

a) a wheeled frame;

b) a reservoir, carried by said wheeled frame;

c) a strainer, positioned over an opening in said reservoir; and d) a trash receptacle comprising a chute and a container, said chute being positioned over an opening in said container, and said trash receptacle being carried by said wheeled frame; wherein:

e) the chute comprises first and second openings, the first opening of the chute being positioned over the opening in said container, and the second opening of the chute being larger than the first opening of the chute;

f) the strainer comprises a plurality of first openings and a second opening, the strainer's plurality of first openings covering a strainer surface which is positioned over the opening in said reservoir, and the second opening of the strainer being smaller than the strainer surface covered by the plurality of first openings;

g) the second opening of the chute extends over the strainer surface which is covered by the plurality of first openings; and h) the chute and the strainer comprise walls which are adjacent to one another when the chute and strainer are respectively positioned over the trash receptacle and the reservoir.

2. A busing cart as in claim 1, wherein the container comprises a lid and a base, said chute being positioned over an opening in said lid.

3. A busing cart as in claim 1, wherein the second opening of the chute is large enough to receive plates to be bused, and the first opening of the chute is smaller than plates to be bused.

4. A busing cart as in claim 1, further comprising:
a) a sink; and
b) a drain pipe forming a conduit between a drain hole of said sink and an interior portion of said reservoir.

5. A busing cart as in claim 4, wherein the sink comprises ledges for supporting one or more glass racks.

6. A busing cart as in claim 1, further comprising at least one first platform for supporting glass racks, and at least one second platform for supporting plates.

7. A busing cart as in claim 6, further comprising a dividing wall, said dividing wall being positioned on the at least one second platform for supporting stacked plates on two opposite sides of the at least one second platform.

8. A busing cart as in claim 1, further comprising a drain mounted in a lower portion of said reservoir, said drain being fitted with a valve for draining said reservoir.

9. A busing cart as in claim 1, wherein the strainer is detachably mounted to the reservoir.

10. A busing cart as in claim 1, wherein:
a) the strainer is detachably fitted to the opening in said reservoir; and
b) the chute is detachably fitted to the opening in said container.

11. A busing cart, comprising:
a) a wheeled frame;
b) a reservoir, carried by said wheeled frame;
c) a strainer, positioned over an opening in said reservoir; and
d) a trash receptacle comprising a chute and a container, said chute being positioned over an opening in said container, and said trash receptacle being carried by said wheeled frame; wherein:
e) the chute comprises first and second openings, the first opening of the chute being positioned over the opening in said container, and the second opening of the chute being larger than the first opening of the chute;
f) the strainer comprises a plurality of first openings and a second opening, the strainer's plurality of first openings covering a strainer surface which is positioned over the opening in said reservoir, and the second opening of the strainer being smaller than the strainer surface covered by the plurality of first openings;
g) the chute comprises walls defining a first three dimensional space;
h) the strainer comprises walls defining a second three dimensional space;
i) a first of the chute's walls is adjacent to a first of the strainer's walls when the chute and strainer are respectively positioned over the trash receptacle and reservoir; and
j) said first walls of the chute and strainer have portions forming an acute angle with respect to horizontal so as to provide the chute with a second opening which is larger than the strainer's second opening.

12. A busing cart as in claim 11, wherein the chute and strainer each have flared lips defining at least portions of their second openings.

13. A busing cart as in claim 12, wherein the flared lips of the chute and strainer extend from each of their walls but for their adjacent first walls.

14. A busing cart as in claim 11, wherein:
a) the strainer is detachably fitted to the opening in said reservoir; and
b) the chute is detachably fitted to the opening in said container.

15. A busing cart, comprising:
a) a wheeled frame;
b) a reservoir, carried by said wheeled frame;
c) a strainer, positioned over an opening in said reservoir;
d) a trash receptacle comprising a chute and a container, said chute being positioned over an opening in said container, and said trash receptacle being detachably mounted on said wheeled frame;
e) a sink; and
f) a drain pipe forming a conduit between a drain hole of said sink and an interior portion of said reservoir; wherein:
i) the chute comprises first and second openings, the first opening of the chute being positioned over the opening in said container, and the second opening of the chute being larger than the first opening of the chute;
ii) the strainer comprises a plurality of first openings and a second opening, the strainer's plurality of first openings covering a strainer surface which is positioned over the opening in said reservoir, and the second opening of the strainer being smaller than the strainer surface covered by the plurality of first openings;
iii) the second opening of the chute extends over the strainer surface which is covered by the plurality of first openings;
iv) the chute and the strainer comprise walls which are adjacent to one another when the chute and strainer are respectively positioned over the trash receptacle and the reservoir; and
v) the sink, strainer, and trash receptacle form a substantially planar top portion of the busing cart.

16. A busing cart as in claim 15, further comprising at least one platform for supporting a dishwasher rack, wherein a first of the at least one platform for supporting a dishwasher rack also forms said substantially planar top portion of the busing cart.

17. A method of busing tables, comprising:
a) pushing to an area to be bused, a wheeled busing cart comprising a reservoir, a strainer positioned over a hole in the reservoir, a trash receptacle comprising a chute and a strainer, said chute being positioned over an opening in said container, said trash receptacle being carried by said wheeled frame, a sink having a drain connected to said reservoir, a platform for supporting glass racks, and a platform for supporting plates, either the first support platform and/or the sink having a plurality of glass racks stored thereon wherein:
i) the chute comprises first and second openings, the first opening of the chute being positioned over the opening in said container, and the second opening of the chute being larger than the first opening of the chute;
ii) the strainer comprises a plurality of first openings and a second opening, the strainer's plurality of first openings covering a strainer surface which is positioned over the opening in said reservoir, and the second opening of the strainer being smaller than the strainer surface covered by the plurality of first openings;

iii) the second opening of the chute extends over the strainer surface which is covered by the plurality of first openings: and
iv) the chute and the strainer comprise walls which are adjacent to one another when the chute and strainer are respectively positioned over the trash receptacle and the reservoir;

b) placing a glass rack on said sink;

c) turning open ends of glasses comprising matter other than liquid and ice into said strainer, thereby collecting said matter other than liquid and ice in said strainer, and collecting liquid in said reservoir;

d) placing empty glasses, and glasses comprising liquid and ice, open end down in the glass rack positioned above the sink;

e) when the strainer is full, emptying its contents into the trash receptacle;

f) when the glass rack placed above the sink is full, moving it to the platform for supporting glass racks, and moving another glass rack from said platform for supporting glass racks to said sink; and g) when said busing cart is full, pushing it to a kitchen area.

* * * * *